United States Patent Office 3,387,015
Patented June 4, 1968

3,387,015
SILTOLYLENE COMPOUNDS
William A. Piccoli, Pittsburgh, Pa., assignor to Dow Corning Corporation, Midland, Mich., a corporation of Michigan
No Drawing. Filed Apr. 26, 1965, Ser. No. 451,061
6 Claims. (Cl. 260—448.8)

This application relates to silcarbanes in which one silicon is attached to a carbon of a methylene group and the other a carbon atom to a phenyl ring.

The compositions of this invention are useful as water repellents as dielectric fluids and as resinous and rubbery compositions.

This invention relates to a compound of the formula

I
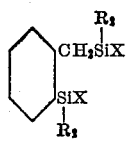

in which R is a monovalent hydrocarbon radical or a radical of the formula R'CH$_2$CH$_2$— in which R' is perfluoroalkyl radical and X is H, alkoxy or OH.

The above compounds are best prepared by reacting α-o-dichlorotoluene, a silane of the formula R$_2$SiXCl, in which R and X are as above defined, and magnesium in a suitable ether solvent such as tetrahydrofuran. The reaction is best carried out in an inert atmosphere such as nitrogen and at a temperature of from 30 to 100° C. It should be understood that the temperature is not critical so long as it is sufficient to cause the reaction to go at a reasonable rate.

Those compounds in which X is OH are best prepared by hydrolysis of the SiH or the alkoxy compounds in the conventional manner for hydrolyzing such compounds.

This invention also relates to cyclic compounds of the formula

II
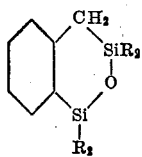

in which R is as above defined.

These cyclic compounds are best prepared by the condensation of diols of Formula I with an alkaline or acidic catalyst in a solvent for I. If desired, one can hydrolyze those compositions of the Formula I where X is alkoxy or hydrogen and simultaneously condense the diols so formed to the cyclic Compounds II.

This invention also relates to polymeric compositions having at least one unit of the formula III
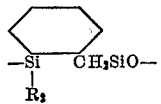

in which R is as above defined. Any remaining units in said polymer are of the formula

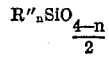

in which R" is a monovalent hydrocarbon radical or a monovalent halo-hydrocarbon radical and $n$ is an integer from 0–3 inclusive.

The polymeric compounds of this invention can be homopolymeric or copolymeric materials. Homopolymers and copolymers in which all of the polymer units have the structure III are best prepared by condensation of the corresponding diols I in the absence of a solvent. This condensation can be carried out with any of the well-known silanol condensation catalysts such as amine salts of carboxylic acids such as tetramethyl guanidine-2-ethylhexoate or alkali metal phenoxides such as sodium phenoxide or salts of heavy metals such as stannous octoate or dibutyl tin dilaurate.

Those copolymers which contain III type units together with

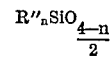

units can be prepared either by the copolymerization of diols I with diols of the formula

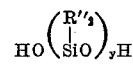

or they can be prepared by the copolymerization of the cyclic Compounds II with cyclic compounds of the formula (R"$_2$SiO)$_x$ or they can be prepared by the co-hydrolysis and co-condensation of alkoxy silanes of the Formula I with silanes of the formula R"$_n$SiZ$_{4-n}$ in which Z is a hydrolyzable group. Any of the above procedures can be carried out in the conventional manner for copolymerizing and/or cohydrolyzing organosilicon compounds.

For the purpose of this invention, R can be any monovalent hydrocarbon radical such as alkyl radicals such as methyl, ethyl, butyl, octadecyl or isopropyl; alkenyl radicals such as vinyl, allyl, hexenyl and octadecenyl; cycloaliphatic hydrocarbon radicals such as cyclohexyl, cyclopentyl, methylcyclohexyl and cyclohexenyl; aryl hydrocarbon radicals such as phenyl, xenyl, naphthyl, tolyl and xylyl and aralkyl hydrocarbon radicals such as benzyl, beta-phenylethyl and beta-phenylpropyl. R can also be any radical of the formula R'CH$_2$CH$_2$— in which R' is a perfluoroalkyl radical such as trifluoromethyl, pentafluoroethyl, heptafluoropropyl or C$_{10}$F$_{21}$.

For the purpose of this invention, $x$ can be hydrogen or hydroxyl or any hydrocarbonoxy radical such as methoxy, ethoxy, octadecyloxy or isopropoxy; and alkenyloxy radical such as allyloxy or octadecenyloxy or any alkoxyalkoxy radical such as beta-methoxy ethoxy, beta-ethoxy ethoxy or CH$_3$O(CH$_2$CH$_2$O)$_2$—. In other words, the term hydrocarbonoxy as used herein means a radical composed of C, H and oxygen in which the latter is either in the form of a COC linkage or a CO-linkage in which the other valence of the O is attached to a Si atom.

R" can be any monovalent hydrocarbon radical such as those specifically shown for R above together with any monovalent halohydrocarbon radical such as chloromethyl, gamma-chloropropyl, chlorovinyl, perfluorovinyl, chlorophenyl, bromophenyl, α,α,α-trifluorotolyl, chloroxenyl, bromo cyclohexyl, fluoro cyclohexenyl, hexafluoro cyclopentyl and trifluoropropyl.

As can be seen, the R" siloxane units shown herein can be of the formula R"$_3$SiO$_{.5}$, R"$_2$SiO, R"SiO$_{1.5}$ or SiO$_2$ units. Thus, the copolymers of this invention can be fluid, elastomeric or resinous materials depending upon the ratio of R" groups to silicon in the composition.

The following examples are illustrative only and should not be construed as limiting the invention which is properly delineated in the appended claims. The following abbreviations are used below, Ph for phenyl and Me for methyl.

Example 1

24.3 g. of magnesium chips were dried in an atmosphere of nitrogen at 100° C. for one hour. A mixture of 94.6 g. of dimethylchlorosilane and 75 ml. of tetrahydrofuran were added to the magnesium. 20 ml. of a solution of 80.5 g. of o-chlorobenzyl chloride in 200 ml. of tetrahydrofuran was added and the mixture was warmed to 33° C. at which temperature the reaction was initiated with a small lump of p-dibromobenzene. It was necessary to maintain the reaction at a temperature of about 68° C. as the remainder of the o-chlorobenzyl chloride solution was added dropwise over a period of 4 hours. Refluxing was continued for 4 hours and the mixture stood at room temperature overnight. The mixture was then heated at a temperature of 72–74° C. for 5 hours. The reaction product was poured over crushed ice and filtered to remove unreacted magnesium. It was then washed to neutrality with water and fractionally distilled to give the compound

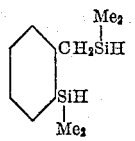

having the following properties. Boiling point 117° C. at 20 mm., $n_D^{25}$, 1.5080 and $d_4^{25}$, 0.889.

Example 2

.4 g. of crushed dry KOH was dissolved in 140 ml. of absolute ethanol and 8 ml. of water by refluxing. 32.1 g. of

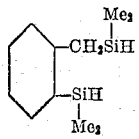

was added dropwise to the refluxing alcoholic alkali over a period of two hours. During this time, the quantitative amount of hydrogen was collected. After the gas evolution had stopped, the mixture was allowed to reflux an additional half hour so as to complete the condensation of the intermediate diol

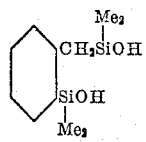

The material was diluted with 150 ml. of benzene and washed with 50 ml. portions of water until neutral. The solution was dried by azeotroping the water and the product was fractionally distilled to give a fluid material boiling 120° C. at 30 mm. This material had the formula

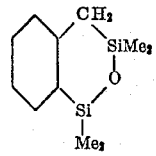

This compound had a refractive index at 25° C. of 1.4961 and a density of 25° C. of 0.9664.

Example 3

13.3 g. of octamethylcyclotetrasiloxane and 1 g. of

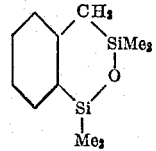

were mixed with a small amount of potassium dimethyl silanolate catalyst and heated at 150° C. for two hours. The product was diluted with benzene and precipitated with methanol. The polymer thus isolated was dried in a vacuum, devolatilized and filtered through Celite. The product was a fluid having a viscosity of 978 cs. at 28° C. and a refractive index at 25° C. at 1.4070. The product was a copolymer of 2.5 mol percent

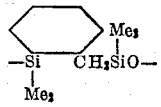

units and 97.5 mol percent dimethylsiloxane units.

Example 4

When the following silanes are reacted with o-chlorobenzylchloride in accordance with the procedure of Example 1, the following products are obtained. In the formulae below A is the

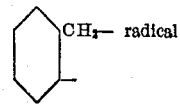 radical

| Silane | Product |
|---|---|
| 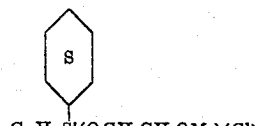 | 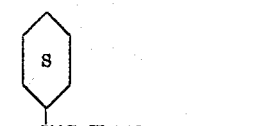 |
| 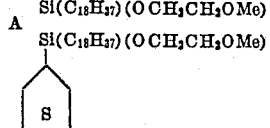 | 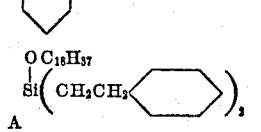 |

| Silane | Product |
|---|---|
| $(C_2F_5CH_2CH_2)_2Si(OCH_2CH=CH_2)(Cl)$ | $\begin{matrix}(CH_2CH_2C_2F_5)_2\\ \overset{|}{Si}-OCH_2CH=CH_2\\ A\\ \overset{|}{Si}-OCH_2CH=CH_2\\ (CH_2CH_2C_2F_5)_2\end{matrix}$ |
| 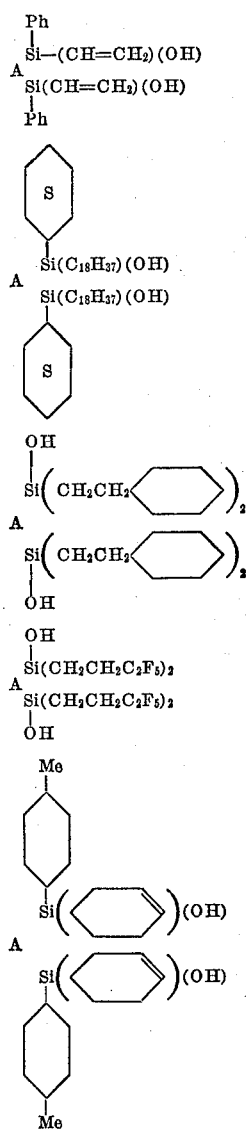 | 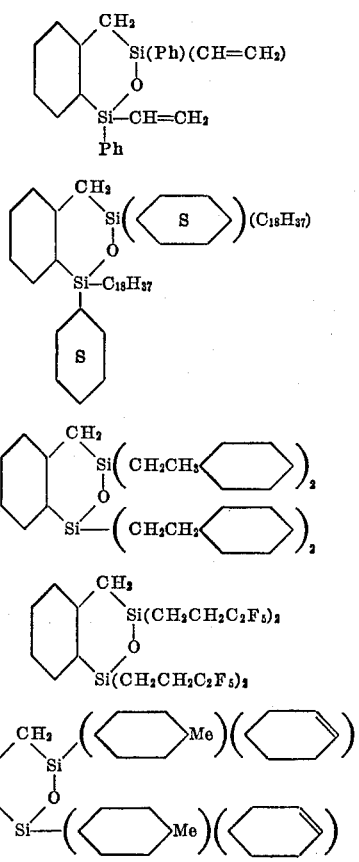 |

Example 5

When the products of Example 4 are hydrolyzed with .1% acetic acid solution the following diols are obtained.

$$\begin{matrix}Ph\\ \overset{|}{Si}-(CH=CH_2)(OH)\\ A\\ \underset{|}{Si}(CH=CH_2)(OH)\\ Ph\end{matrix}$$

$$\begin{matrix}\overset{S}{\bigcirc}\\ |\\ Si(C_{18}H_{37})(OH)\\ A\\ Si(C_{18}H_{37})(OH)\\ |\\ \underset{S}{\bigcirc}\end{matrix}$$

$$\begin{matrix}OH\\ |\\ Si(CH_2CH_2-\!\!\bigcirc)_2\\ A\\ Si(CH_2CH_2-\!\!\bigcirc)_2\\ |\\ OH\end{matrix}$$

$$\begin{matrix}OH\\ |\\ Si(CH_2CH_2C_2F_5)_2\\ A\\ Si(CH_2CH_2C_2F_5)_2\\ |\\ OH\end{matrix}$$

(Me-phenyl-Si structure with two (OH) groups, bridged by A, with Me-phenyl group)

Example 6

When the diols of Example 5 are condensed in accordance with the procedure of Example 2, the following cyclic compounds are obtained.

Example 7

When the diol

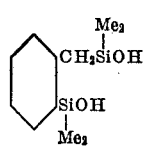

is heated with sodium phenoxide at 100° C., a polymer of the unit formula

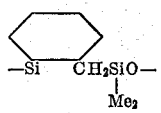

is obtained.

small amount of KOH with the following silanes the following copolymers are obtained. The copolymer unit

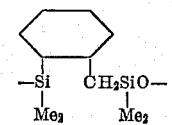

is represented by the numeral (1).

| Silanes | Copolymer |
|---|---|
| 50 mol percent<br>CH=CH₂<br>\|<br>MeSi(OMe)₂ | 50 mol percent (1)<br>50 mol percent (Me)(CH₂=CH)SiO |
| 10 mol percent C₁₈H₃₇Si(OMe)₃<br>10 mol percent Me₃SiOMe | 10 mol percent C₁₈H₃₇SiO₁.₅<br>10 mol percent Me₃SiO.₅ |
| 40 mol percent<br>⟨S⟩Si(OMe)₂ with Me<br>30 mol percent<br>PhSi(OMe)₂<br>⟨⟩Me | 40 mol percent<br>⟨S⟩SiO with Me<br>30 mol percent<br>PhSiO<br>⟨⟩Me |
| 10 mol percent CF₃CH₂CH₂Si(OMe)₃ | 10 mol percent CF₃CH₂CH₂SiO₁.₅ |
| 10 mol percent Cl⟨⟩Si(OMe)₂ | 10 mol percent Cl⟨⟩SiO₁.₅ |
| 10 mol percent Cl(CH₂)₃Si(OMe)₂ | 10 mol percent Cl(CH₂)₃SiO₁.₅ |
| 60 mol percent<br>Cl⟨S⟩Si(OMe)₂ with Me | 60 mol percent<br>Cl⟨S⟩SiO with Me<br>10 mol percent (1) |
| 10 mol percent Si(OEt)₄<br>45 mol percent Me₃SiOMe | 10 mol percent SiO₂<br>45 mol percent Me₃SiO.₅<br>45 mol percent (1) |

Example 8

When an equimolar mixture of the diols

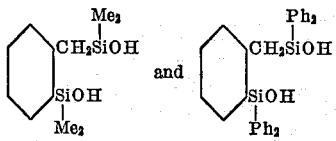

is heated with sodium phenoxide in tetralin a copolymer of 50 mol percent

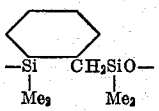

and 50 mol percent

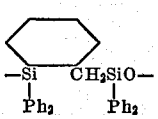

is obtained.

Example 9

When the compound

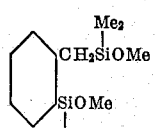

is cohydrolyzed and co-condensed in the presence of a

That which is claimed is:

1. A composition of the formula

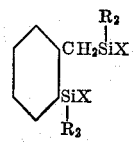

in which R is selected from the group consisting of monovalent hydrocarbon radicals and radicals of the formula R′CH₂CH₂— where R′ is a perfluoroalkyl radical and X is selected from the group consisting of hydrogen, hydroxyl and hydrocarbonoxy radicals.

2. A composition in accordance with claim 1 where each R is methyl and each X is hydrogen.

3. A compound of the formula

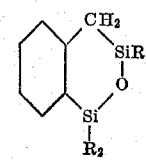

in which R is selected from the group consisting of monovalent hydrocarbon radicals and radicals of the formula R′CH₂CH₂— in which R′ is a perfluoroalkyl radical.

4. Composition in accordance with claim 2 in which each R is methyl.

5. A polymeric siloxane having at least one unit of the formula

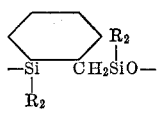

in which R is selected from the group consisting of monovalent hydrocarbon radicals and radicals of the formula R'CH$_2$CH$_2$— in which R' is a perfluoroalkyl radical, any remaining units in said polymer being of the formula

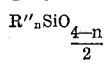

in which R" is selected from the group consisting of monovalent hydrocarbon radicals and monovalent halohydrocarbon radicals and $n$ is an integer from 0 to 3 inclusive.

6. A copolymer in accordance with claim 5 in which each R and each R" is methyl.

References Cited
UNITED STATES PATENTS

| | | |
|---|---|---|
| 3,050,542 | 8/1962 | Piccoli. |
| 3,150,115 | 9/1964 | Clark et al. ____ 260—448.2 XR |
| 3,175,993 | 3/1965 | Weyenberg ____ 260—448.2 XR |
| 3,304,320 | 2/1967 | Spencer. |

TOBIAS E. LEVOW, *Primary Examiner.*

P. F. SHAVER, *Assistant Examiner.*